US010261920B2

(12) United States Patent
Bell

(10) Patent No.: US 10,261,920 B2
(45) Date of Patent: Apr. 16, 2019

(54) STATIC IMAGE RAM DRIVE

(71) Applicant: Donna Bell, Jacksonville, FL (US)

(72) Inventor: Jason Bell, Jacksonville, FL (US)

(73) Assignee: The United States of America as presented by the Secretary of the Navy, Washington, DC (US)

( * ) Notice: Subject to any disclaimer, the term of this patent is extended or adjusted under 35 U.S.C. 154(b) by 100 days.

(21) Appl. No.: 15/697,565

(22) Filed: Sep. 7, 2017

(65) Prior Publication Data

US 2018/0081828 A1   Mar. 22, 2018

Related U.S. Application Data

(60) Provisional application No. 62/395,453, filed on Sep. 16, 2016.

(51) Int. Cl.
| | |
|---|---|
| *G06F 12/14* | (2006.01) |
| *G06F 9/44* | (2018.01) |
| *G06F 21/57* | (2013.01) |
| *G06F 21/76* | (2013.01) |
| *G06F 21/79* | (2013.01) |
| *H04L 9/08* | (2006.01) |
| *G06F 9/4401* | (2018.01) |
| *G06F 21/80* | (2013.01) |

(52) U.S. Cl.
CPC ........ *G06F 12/1408* (2013.01); *G06F 9/4401* (2013.01); *G06F 21/575* (2013.01); *G06F 21/76* (2013.01); *G06F 21/79* (2013.01); *H04L 9/0891* (2013.01); *G06F 21/80* (2013.01); *G06F 2212/1052* (2013.01)

(58) Field of Classification Search
CPC .. G06F 12/1408; G06F 9/4401; G06F 21/575; G06F 21/76; G06F 21/79; H04L 9/0891
See application file for complete search history.

(56) References Cited

U.S. PATENT DOCUMENTS

| | | | |
|---|---|---|---|
| 9,606,810 B2 * | 3/2017 | Schmalz | G06F 9/4406 |
| 9,904,557 B2 * | 2/2018 | Buhler | G06F 21/575 |
| 2017/0237560 A1 * | 8/2017 | Mueller | H04L 9/30 713/168 |
| 2017/0249133 A1 * | 8/2017 | Herzi | G06F 8/63 |

* cited by examiner

*Primary Examiner* — Stefan Stoynov
(74) *Attorney, Agent, or Firm* — Olivia R. Scheuer; NAWCAD

(57) ABSTRACT

An apparatus and method of a static image RAM drive is provided. The system includes a field programmable gate array (FPGA), a volatile memory drive, a non-volatile memory drive, and a power source. The non-volatile memory drive has a secure memory space. The secure memory space is programmed with an encryption key and an encrypted disk image. In response to a power cycle, the FPGA reads the encrypted disk image from the non-volatile memory, authenticates the disk image using the encryption key, decrypts the encrypted disk image, and writes the decrypted disk image to the volatile memory. The decrypted disk image is used to boot a computer. The computer is booted to a known good state each time the power is cycled.

6 Claims, 2 Drawing Sheets

STATIC IMAGE RAM DRIVE

STATEMENT OF GOVERNMENT INTEREST

The invention described herein may be manufactured and used by or for the Government of the United States of America for governmental purposes without payment of any royalties thereon or therefor.

BACKGROUND

In computing, booting of the operating system, as well as additional systems, is required to initialize the computer system. Generally, the operating system is loaded into main memory from persistent memory. Often the booting process can take tens of seconds to minutes, based on the computer anatomy. For example, the operating system is loaded into main memory (e.g., RAM) from persistent memory (e.g., a hard drive).

As the use of computers, and computing devices, become more and more integrated into daily events and business, the safety associated with computers is of utmost importance. One potential security threat is changes made to the operating system by an intruder, such as stealing, editing, or deleting. Such security threats can be disastrous as they can lead to computer failures and data leaks.

SUMMARY

In general, in one aspect, a memory drive of a computer comprising: a field programmable gate array (FPGA); a volatile memory drive; a non-volatile memory drive, having a secure memory space wherein the secure memory space is programmed with a public encryption key and an encrypted disk image; a power source; and wherein the FPGA reads the encrypted disk image from the non-volatile memory, decrypts the encrypted disk image, and writes the decrypted disk image to the volatile memory when power is applied; wherein the decrypted disk image is used to boot a computer; and wherein the computer is booted to a known good state each time the power is cycled.

In general, in another aspect, a method of booting a computer program, the method comprising: providing power to a computer having a memory drive, wherein the memory drive comprises a field programmable gate array (FPGA), a non-volatile memory drive having a secure memory space, and a volatile memory drive; receiving, by the FPGA, an encrypted disk image, wherein the encrypted disk image is stored on the secure memory space; authenticating the disk image using private-public key pairs to retrieve the encryption key; decrypting, by the FPGA, the encrypted disk image; writing, by the FPGA, the decrypted disk image to the volatile memory drive; and booting, by the FPGA, the decrypted disk image on the computer, wherein the computer is booted to a known good state when power is cycled.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Embodiments of the present invention recognize that security of an operating system, among other computer files, is imperative for computer security. In many existing technologies, the operating system is open for attack. Further, once an operating system, or another prominent program, has been attacked, reoccurring use of the damaged operating system can cause ongoing and increased problems. Embodiments of the present invention are a system to protect an operating system, or another program, reducing the risks associated with malware.

Embodiments of the present invention function as a standard mass storage device—including, but not limited to, Serial Advanced technology Attachment (SATA). SATA interfaces, select memory, and an integrated circuit are used to protect prominent programs from malware attacks. Embodiments of the present invention are an alternative to mass storage and SATA devices, found in existing computing devices. Embodiments of the present invention provide a means to provide a clean copy of an operating system or program each time the computer is booted.

In the following description of the present invention, reference will be made to various embodiments which are not all inclusive. The current invention can be implemented using various forms of software and hardware. However, the preferred embodiments and best mode of the present invention are illustrated by way of example below and in FIG. 1 through FIG. 2.

Figure 1:
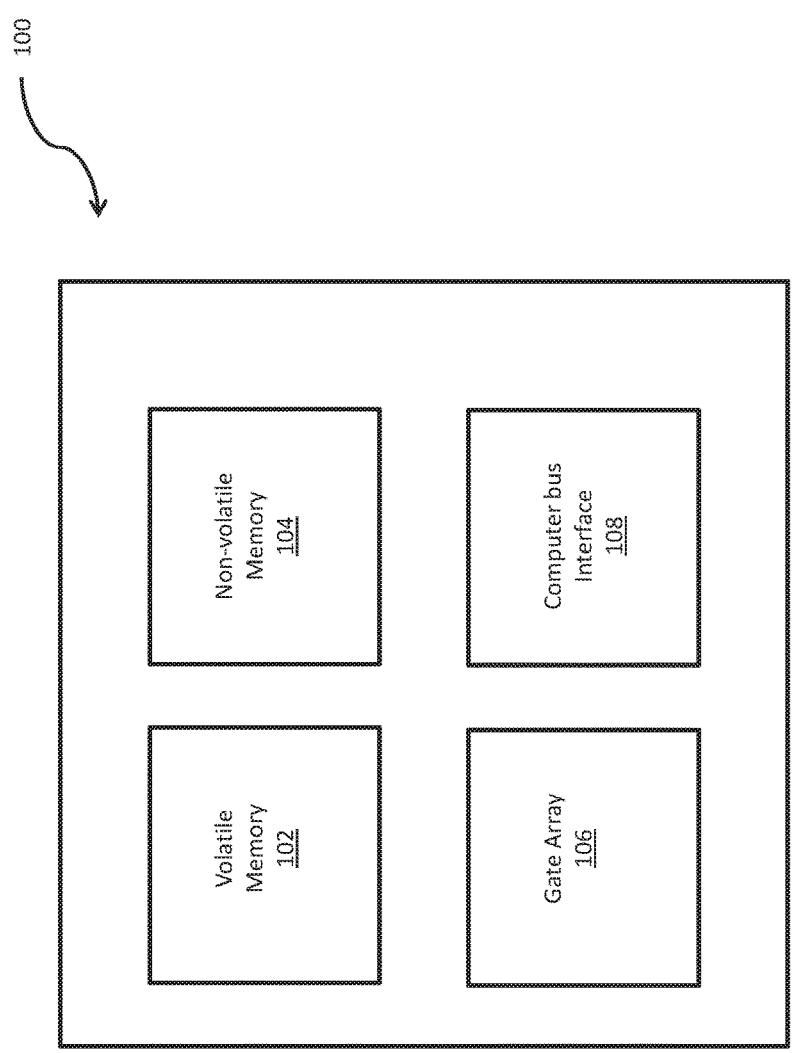
FIG. 1 is a functional block diagram illustrating the hardware of the static image RAM drive, in accordance with an embodiment of the present invention.

Referring to FIG. 1, a functional block diagram illustrating the hardware of the static image RAM drive is shown. Static image RAM drive 100 includes volatile memory 102, non-volatile-memory 104, gate array 106, computer bus interface 108, and a power input (not shown). In some embodiments, static image RAM drive 100 includes additional components.

Volatile memory 102 is a memory component where data stored is lost rapidly when power to the component is interrupted. In some embodiments, a disk image is written to volatile memory 102 after the disk image has been decrypted. The decrypted disk image is lost when power is removed from static image RAM drive 100.

Non-volatile memory 104 is a memory component which maintains data stored regardless of power being supplied to the component. Non-volatile memory 104 can include, but is not limited to, read-only memory (ROM), flash memory, hard drives, and optical disks.

Gate array 106 is a prefabricated chip of integrated circuits, capable of being programmed for a specific set of applications. Gate array 106 reads and/or writes to each of volatile memory 102 and non-volatile memory 104. For example, gate array 106 loads the encrypted disk image from the first non-volatile memory, decrypts the disk image, and writes the decrypted disk image to volatile memory 102. Where the disk image is an operating system, a computer can utilize the operating system written to the volatile memory in the booting process. In response to the decrypted image loading to the volatile memory, the gate array 106 functions as a mass storage device (e.g. SATA) for both volatile and non-volatile memory.

Computer bus interface 108 is one or more interfaces for the connection of host bus adapters to mass storage devices, such as volatile memory 102 and non-volatile memory 104.

Figure 2:
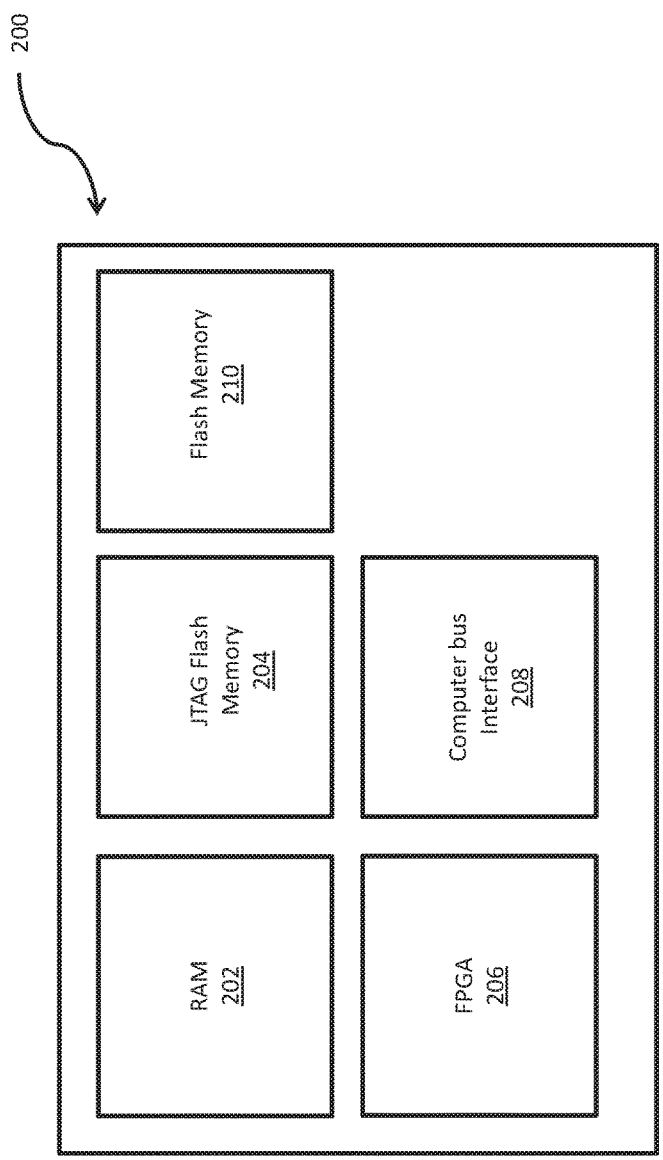
FIG. 2 is a functional block diagram illustrating the hardware of a JTAG utilized static image RAM drive, in accordance with an embodiment of the present invention.

FIG. 2 is an example hardware embodiment of a static image RAM drive allowing external updating of the secure image. JTAG static image RAM drive 200 includes RAM 202, JTAG flash memory 204, FPGA 206, computer bus interface 208, and flash memory 210. In some embodiments, JTAG static image RAM drive 200 includes additional components (e.g., a power input).

RAM 202 functions as volatile memory (e.g., volatile memory 102). A disk image is loaded to RAM 202 after the image has been decrypted by FPGA 206. JTAG flash memory 204 functions as non-volatile memory (e.g., non-volatile memory 104). In some embodiments, JTAG flash memory 204 requires a physical device connection to load updates to JTAG static image RAM drive 200. Updates include, but are not limited to, decryption keys, network server IP addresses, and new device functionality. In some embodiments, the physical connection would function as a hardware key authenticator. In some embodiments, updates can be done via non-physical means, such as USB, SATA disk, or Ethernet.

In some embodiments, the required physical connection of the JTAG device prevents writing or alteration of encrypted images by other connected devices (e.g., USB, SATA, or Ethernet). In some embodiments, the use of a public and private key system prevents forged disk images from working, as only images decrypted by the JTAG programmed encryption keys will work.

FPGA 206 functions as a gate array (e.g., gate array 106). In some embodiments, FPGA 206 can be programmed to prevent the writing of specific sectors of RAM 202, such that a properly constructed image will have noted the location of protected executable files. Known locations of executable files can aid in preventing software from changing executable files while running.

In some embodiments, computer bus interface 208 functions as a SATA (e.g., computer bus interface 108). Flash memory 210 functions as non-volatile memory (e.g., non-volatile memory 104).

In some embodiments, an advantage of the static image RAM drive is that decrypted disk images are erased each time power is cycled. Power is cycled by removing power from the system and then restoring power to the system. Therefore, a new, clean, operating system is loaded each time power is provided to the system.

In some embodiments, the static image RAM drive (e.g., static image RAM drive 100) can update the secure image stored in non-volatile memory 104 using encryption to authenticate the new image prior to updating. For example, where the RAM drive requires a physical connection to an outside source, such as the JTAG static image RAM drive depicted in FIG. 2, an encrypted image is received from a number of external sources. For example, some sources include a universal serial bus (USB) device (e.g., hard drive or thumb drive), a USB host from an external computer, a SATA hard drive, or a networked computer (e.g., FTP server, SFTP server, or a computer running image builder software).

Example 1

The following example is used to demonstrate one application of the present invention; therefore, the example should not be construed as limiting. This example utilizes a JTAG static image RAM drive, as depicted in FIG. 2. The secure image is stored on flash memory 210 and updated via external connection. In some embodiments, updates can be done via USB, SATA disk, or Ethernet. An asymmetric encryption key is used to authenticate that the update is authorized prior to updating the secure image. At manufacture, a public key is burned into the JTAG flash memory 204 (e.g., Public 2048-bit RSA key, ECC, Diffie-Hellman) and a private key is stored on separate image builder software. The builder software is used to generate and encrypt the secure image with a new symmetric encryption key. The symmetric encryption key is then encrypted using the image builder software's private key and the RAM drive's public key. Only authorized maintainers, possessing the builder software, can build secure images. This ensures that images are built and authenticated with chain-of-custody to authorized maintainers. JTAG flash memory 204 can be updated physically to change the public asymmetric encryption key, or the encrypted symmetric (e.g. AES 256-bit, Twofish, Serpent) encryption key used for high speed encryption and decryption of the secure image. On boot, the RAM drive's private key and the image builder software's public key are used to authenticate the image and retrieve the symmetric encryption key. The symmetric encryption key is then used to decrypt the secure image and load into volatile memory for booting.

Example 2

The following example is used to demonstrate one application of the present invention; therefore, the example should not be construed as limiting. This example utilizes a JTAG static image RAM drive, as depicted in FIG. 2, and is an example of installing the static image RAM drive on a web server. The static image RAM drive is the primary drive and a solid state drive (SSD) serves as a secondary drive. The web server is connected to a LAN network with a local file server and an internet network. The web server has a software manager. The software manager builds a stable image, which references all executables on the static image RAM drive and all writable data on the SSD. The stable image makes a list of the write protected sectors on the static image RAM drive, is encrypted using a private key, and is stored in a proper location on the LAN server.

The static image RAM drive is connected to a JTAG programming key, and static image RAM drive firmware is updated to include a public key and optional network server addresses. The static image RAM drive is connected via USB to a computer that copies the initial encrypted stable image. The static image RAM drive is then installed onto the web server as a standard primary boot SATA drive.

The web server is powered on. Upon power-up, the FPGA decrypts the stable image and stores it to RAM. The static image RAM drive then goes into SATA disk drive mode. As a result, the web server runs faster as the static image RAM drive functions with the speed of the RAM. The web server can save all dynamically changed persistent data to the SSD. The web server is unable to modify the executable on the primary drive. Patches can be made by distributing an encrypted image to trusted file servers. If any problems arise with the web server software integrity or stability, cycling the power will restore the last known good state.

Example 3

The following example is used to demonstrate one application of the present invention; therefore, the example should not be construed as limiting. This example utilizes a JTAG static image RAM drive, as depicted in FIG. 2, and is an example of installing a static image RAM drive on a non-networked utility device. The software manager builds a stable image, which references all executables on the static image RAM drive and all writable data on the SSD. The stable image makes a list of the write protected sectors on the static image RAM drive, is encrypted using a private key, and is stored in a proper location on the LAN server.

The static image RAM drive is connected to a JTAG programming key, which updates the static image RAM drive to include a public key and optional network server addresses. The static image RAM drive is connected via USB to a computer that copies the initial encrypted stable image.

The utility device is powered on. The static image RAM drive authenticates and then decrypts a static image, loads the image to the RAM, and begins to function as a SATA RAM drive. The utility device boots and functions. When the utility device is powered down, the RAM is cleared and any malicious software effects are erased.

The above description is that of current embodiments of the invention. Various alterations and changes can be made without departing from the spirit and broader aspects of the invention as defined in the appended claims.

In many embodiments, the present invention can be used in conjunction with ordinary computing devices. For example, the computing device may include computer processor(s), a communications unit, and communications fabric. In some embodiments, computer components such as memory, cache, persistent storage, and input/output interfaces are encompassed in the present invention.

What is claimed is:

1. A memory drive of a computer comprising:
   a field programmable gate array (FPGA);
   a volatile memory drive;
   a non-volatile memory drive, having a secure memory space, wherein the secure memory space is programmed with a public encryption key and an encrypted disk image;
   a power source; and
   wherein the FPGA reads the encrypted disk image from the non-volatile memory, decrypts the encrypted disk image, and writes the decrypted disk image to the volatile memory drive in response a power cycle;
   wherein the decrypted disk image is used to boot a computer; and
   wherein the computer is booted to a known good state each time the power is cycled.

2. The memory drive of claim 1, wherein the encrypted disk image is updated by a device comprising image builder software;
   wherein the device comprising image builder software includes a builder software private key;
   wherein the image builder software builds and encrypts a secure image using a symmetric encryption key, and writes the secure image to the secure memory space;
   wherein the symmetric encryption key is encrypted using the builder software private key and the public encryption key and
   wherein the FPGA reads the secure image, authenticates using the public encryption key with the builder software private key, and writes the secure image over the encrypted disk image on the secure memory space.

3. A method of booting a computer program, the method comprising:
   providing power to a computer having a memory drive, wherein the memory drive comprises a field programmable gate array (FPGA), a non-volatile memory drive having a secure memory space, and a volatile memory drive;
   receiving, by the FPGA, an encrypted disk image, wherein the encrypted disk image is stored on the secure memory space;
   authenticating, by the FPGA, the encrypted disk image, wherein a public-private key pair exchange is provided to the FPGA, and a symmetric encryption key is used to decrypt the encrypted disk image; and
   writing, by the FPGA, the decrypted disk image to the volatile memory drive; and
   booting, by the FPGA, the decrypted disk image on the computer, wherein the computer is booted to a known good state when power is cycled.

4. The method of claim 3, wherein the encrypted disk image is an operating system.

5. The method of claim 3, wherein the decrypted disk image is removed from the volatile memory drive in response to a power loss to the memory drive.

6. The method of claim 3, wherein the encrypted disk image is updated, the method comprising:
   loading, by a user, a secure disk image and an encryption key to a device comprising image builder software;
   connecting via one or more ports, by a user, the device comprising the image builder software to the computer comprising the memory drive;
   receiving, by the FPGA, the secure disk image and the encryption key;
   authenticating, by the FPGA, the public-private key pair; and
   in response to a positive authentication, writing, by the FPGA, the secure disk image over the encrypted disk image.

* * * * *